(12) United States Patent
Yi et al.

(10) Patent No.: US 9,556,392 B2
(45) Date of Patent: Jan. 31, 2017

(54) GASIFICATION COMBINED FACILITY FOR CARBON FUEL INCLUDING PNEUMATIC CONVEYING DRYER

(71) Applicants: SK INNOVATION CO., LTD., Seoul (KR); SK ENERGY CO., LTD., Seoul (KR)

(72) Inventors: Min Hoe Yi, Daejeon (KR); In Kwon Bae, Seoul (KR); Gyoo Tae Kim, Daejeon (KR); Jae Wook Shin, Seoul (KR)

(73) Assignees: SK INNOVATION CO., LTD, Seoul (KR); SK ENERGY CO., LTD., Seoul (KR)

( * ) Notice: Subject to any disclaimer, the term of this patent is extended or adjusted under 35 U.S.C. 154(b) by 0 days.

(21) Appl. No.: 14/654,883

(22) PCT Filed: Dec. 24, 2013

(86) PCT No.: PCT/KR2013/012106
§ 371 (c)(1),
(2) Date: Jun. 23, 2015

(87) PCT Pub. No.: WO2014/104712
PCT Pub. Date: Jul. 3, 2014

(65) Prior Publication Data
US 2015/0344794 A1 Dec. 3, 2015

(30) Foreign Application Priority Data
Dec. 26, 2012 (KR) .................. 10-2012-0153791

(51) Int. Cl.
*C10J 3/72* (2006.01)
*C10K 3/04* (2006.01)
(Continued)

(52) U.S. Cl.
CPC .. *C10J 3/72* (2013.01); *C01B 3/12* (2013.01); *C10K 3/04* (2013.01); *F26B 23/001* (2013.01);
(Continued)

(58) Field of Classification Search
CPC ... F26B 17/10; F26B 2200/02; F26B 2200/18; C10J 3/00
See application file for complete search history.

(56) References Cited

U.S. PATENT DOCUMENTS

2007/0270511 A1* 11/2007 Melnichuk ............ C07C 29/149
518/700
2011/0314736 A1    12/2011 Crespin

FOREIGN PATENT DOCUMENTS

CN         101910372 A      12/2010
JP         07002950 B        1/1995
(Continued)

OTHER PUBLICATIONS

Office Action for CN 201380073615.0 dated Aug. 17, 2016 with English language Summary of Office Action (8 pages).

*Primary Examiner* — Matthew Merkling
(74) *Attorney, Agent, or Firm* — Abelman, Frayne & Schwab

(57) ABSTRACT

This invention relates to an integrated gasification apparatus for carbonaceous fuel, wherein high-pressure steam produced during a gasification process of carbonaceous fuel is directly used to dry the carbonaceous fuel, and steam obtained through the drying process is directly used in a water gas shift process.

11 Claims, 2 Drawing Sheets

(51) Int. Cl.
  *C01B 3/12* (2006.01)
  *F26B 23/00* (2006.01)
  *C10J 3/00* (2006.01)

(52) U.S. Cl.
  CPC ............... *C10J 3/00* (2013.01); *C10J 2200/09* (2013.01); *C10J 2300/093* (2013.01); *C10J 2300/0909* (2013.01); *C10J 2300/0916* (2013.01); *C10J 2300/0943* (2013.01); *C10J 2300/1884* (2013.01); *Y02P 20/145* (2015.11); *Y02P 70/405* (2015.11)

(56) References Cited

FOREIGN PATENT DOCUMENTS

| | | | |
|---|---|---|---|
| JP | 2010535282 | A | 11/2010 |
| JP | 2011522951 | A | 8/2011 |
| KR | 1020120056091 | A | 6/2012 |
| KR | 1020120064030 | A | 6/2012 |

\* cited by examiner

GASIFICATION COMBINED FACILITY FOR CARBON FUEL INCLUDING PNEUMATIC CONVEYING DRYER

CROSS-REFERENCE TO RELATED APPLICATIONS

This application is a National Phase of PCT/KR2013/012106, filed 24 Dec. 2013, which claims priority from Korean Application No. 10-2012-0153791 filed 26 Dec. 2012, the disclosures of which are all incorporated herein by reference.

BACKGROUND OF THE INVENTION

1. Technical Field

The present invention relates to an integrated gasification apparatus for carbonaceous fuel including a flash dryer.

This application claims the benefit of priority No. KR 2012-0153791 filed on Dec. 26, 2012.

2. Description of the Related Art

In order to produce electricity, chemical materials and synthetic fuel or to achieve a variety of applications thereof, fossil fuel such as coal may be gasified. Gasification indicates production of a syngas that is made up of carbon monoxide and hydrogen via incomplete combustion of hydrocarbon fuel and oxygen at very high temperature, so that the produced gas has higher efficiency than that of original materials and may be discharged in the form of a material that causes less environmental pollution.

Carbonaceous fuel is typically dried before gasification. This is because fuel having low water content may be more easily combusted and may be more efficiently gasified. However, the case of using fuel having high water content such as low-grade coal and biomass is problematic because high costs are required to remove water and it is difficult to perform gasification with the presence of water. For example, biomass such as corn stalk has such high water content that it is inefficient for fuel gasification. When carbonaceous fuel having high water content is used, such water in fuel may decrease fluidity and may frequently incur plugging during handling and transport of the fuel, and high costs and energy are required to remove water from the fuel.

In order to lower water content of fuel to improve gasification efficiency, a large amount of heat should be transferred to a drying target, and thus a dryer should be made so as to have the shape and size adapted therefor. Currently, limitations are imposed on lowering the water content of fuel having high water content via heat supply and retention time in a typical atmospheric dryer, undesirably decreasing efficiency of the gasification apparatus.

In the case when steam produced through heat recovery during the gasification process is indirectly used as a heat source of a dryer, the cost for a heat exchanger is additionally required. Furthermore, gas discharged from the dryer after treatment of carbonaceous fuel may be emitted to the atmosphere only after passing thorough heat recovery and purification facilities, and thus the facility cost therefor is also additionally required.

The syngas produced through the gasification process is subjected to a purification process and a reforming process to produce chemical products or synthetic fuel. The purification process enables materials such as fine powder, sulfur, mercury, carbon dioxide, etc. to be removed from the syngas, and the reforming process makes the composition of the syngas adjustable. As such, the $H_2/CO$ ratio in the syngas is regarded as important to produce chemical products, and the required value thereof varies depending on final products. For example, in the case of a Fischer-Tropsch (F-T) process, the $H_2/CO$ ratio should be set to 2:1.

The process of adjusting the $H_2/CO$ ratio is typically exemplified by a water gas shift process, which carries out the reaction of the following Scheme 1 using a catalyst under high-pressure conditions (e.g. 12~30 bar).

[Scheme 1]

The water gas shift process may be classified depending on the conditions of catalyst used, and is largely divided into a sour shift process (about 270~510° C.) and a sweet shift process (about 177~316° C.) depending on whether syngas before or after removal of impurities such as $H_2S$ therefrom is used. Individual processes are favorable in terms of decreasing the equilibrium concentration of CO and increasing the reaction rate in proportion to an increase in concentration of $H_2O$. Hence, in the case when the concentration of $H_2O$ in the syngas is not sufficient, steam may be added to the process so as to increase the conversion of CO. However, supply of high-pressure steam increases the process costs.

In the gasification process, additional high-pressure steam may be needed in the water gas shift reaction able to increase the $H_2/CO$ ratio. However, to produce such high-pressure steam, additional water resources and water purification/heat exchange facilities are required.

SUMMARY OF THE INVENTION

Accordingly, the present invention has been made keeping in mind the problems encountered in the related art, and an aspect of the present invention is to provide an integrated gasification apparatus for carbonaceous fuel, wherein high-pressure steam produced during a gasification process of carbonaceous fuel is directly used to dry the carbonaceous fuel, and steam obtained through the above drying process is directly used in a water gas shift process.

In an embodiment of the present invention, an integrated gasification apparatus for carbonaceous fuel may comprise a gasifier to react carbonaceous fuel and a gasification agent to produce a syngas, wherein the gasifier includes a heat exchanger; a flash dryer to lower water content of the carbonaceous fuel containing water fed into the flash dryer using high-pressure steam produced in the heat exchanger; and a water gas shift reactor to produce hydrogen and carbon dioxide from the steam discharged from the flash dryer and the syngas.

In the embodiment of the present invention, the carbonaceous fuel may be selected from the group consisting of low-grade coal, biomass, and petroleum cokes, and examples thereof may include bituminous coal, sub-bituminous coal, lignite, waste wood, palm byproducts, corn stalk, sugar cane, etc.

In the embodiment of the present invention, the water content of the carbonaceous fuel fed into the flash dryer may be 10~60 wt % based on the total weight of the carbonaceous fuel.

In the embodiment of the present invention, the carbonaceous fuel fed into the flash dryer may have a particle size of 2 mm or less.

In the embodiment of the present invention, the steam fed into the flash dryer may have a temperature of 260~500° C.

In the embodiment of the present invention, the steam fed into the flash dryer may have a pressure of 12~44 bar.

In the embodiment of the present invention, the water content of the carbonaceous fuel discharged from the flash dryer may be 1~10 wt % based on the total weight of the carbonaceous fuel.

In the embodiment of the present invention, the steam discharged from the flash dryer may have a temperature of 198~350° C.

In the embodiment of the present invention, the carbonaceous fuel and the steam may be fed to the bottom of the flash dryer and then discharged from the top of the flash dryer.

In the embodiment of the present invention, the carbonaceous fuel and the steam may be fed to the top of the flash dryer and then discharged from the bottom of the flash dryer.

In the embodiment of the present invention, the apparatus may further comprise a purifier for separating fine particles from the steam discharged from the flash dryer.

In the embodiment of the present invention, the flash dryer may comprise a high-pressure feeder for feeding the carbonaceous fuel, a dryer tube for feeding the steam, a cyclone for separating the steam and the carbonaceous fuel, a filter for separating fine particles from the steam separated by the cyclone, and a storage tank for storing the carbonaceous fuel.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
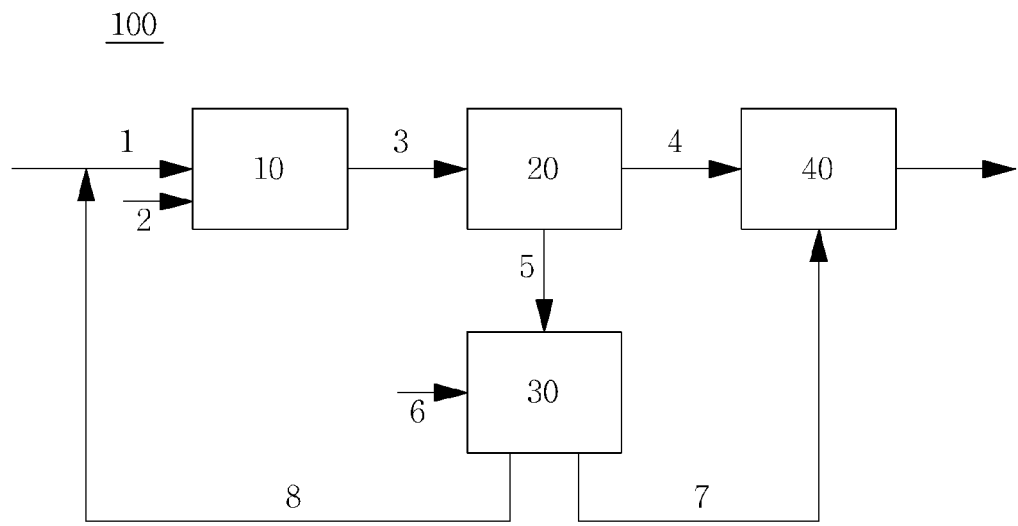
FIG. 1 is a block diagram illustrating an integrated gasification apparatus for carbonaceous fuel according to an embodiment of the present invention.

Before the present invention is described in more detail, it must be noted that the terms and words used in the present specification and claims should not be interpreted as being limited to typical meanings or dictionary definitions, but should be interpreted as having meanings and concepts relevant to the technical scope of the present invention based on the rule according to which an inventor can appropriately define a concept implied by a term to best describe the method he or she knows for carrying out the invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components.

In the following description, it is to be noted that, when known techniques related with the present invention may make the gist of the present invention unclear, a detailed description thereof will be omitted.

Further, in the following description, the terms "first," "second" and the like are used to differentiate a certain component from other components, but the configuration of such components should not be construed to be limited by the terms.

Hereinafter, a detailed description will be given of embodiments of the present invention, with reference to the appended drawings.

According to an embodiment of the present invention, a flash dryer may be used, which is able to directly use high-pressure steam produced through heat recovery in a gasification process in order to dry carbonaceous fuel and enables a short retention time of a drying target. Thereby, water content of the carbonaceous fuel may be lowered to 1~10% using high-temperature high-pressure steam. Thus, the size of a gasifier may be reduced and the oxygen consumption may decrease, ultimately increasing the total efficiency of the gasification process.

According to an embodiment of the present invention, steam used in the flash dryer is utilized in a water gas shift process, thus increasing heat efficiency of the entire process. Moreover, as water contained in the carbonaceous fuel is used, the use of water resources of the entire process may be reduced.

Specifically, according to an embodiment of the present invention, the carbonaceous fuel having high water content used in the gasifier is ground to a size of 2 mm or less. The transported carbonaceous fuel is pressurized, stored, and then fed into the flash dryer using a high-pressure feeder. As steam corresponding to a drying medium in the flash dryer, high-pressure steam produced in the course of recovering heat generated from the gasification process using a syngas cooler, HRSG (Heat Recovery Steam Generator), etc. is directly utilized. The high-temperature high-pressure steam is fed into the flash dryer so that heat transfer rapidly occurs to the drying target from the drying medium, thereby evaporating the fed carbonaceous fuel having a water content of about 10~60% for a retention time of ones of seconds, resulting in carbonaceous fuel having a water content of about 1~10%.

The dried carbonaceous fuel is separated from the steam using a separator such as a cyclone. The separated dry carbonaceous fuel is fed into the gasifier so that it reacts with a gasification agent such as oxygen, steam, carbon dioxide, etc., thus synthesizing a syngas. The syngas produced in the gasifier has a high temperature of 800~1000° C. and may be discharged at 1~50 atm, and the temperature and pressure ranges of the syngas discharged from the gasifier may vary depending on the kind and volume of the gasifier. The gasifier useful in the present invention may include any gasifier, including an entrain flow gasifier, a high-velocity fluidized bed gasifier, etc.

The produced syngas is passed through a heater exchanger and then a purifier, and then undergoes a water gas shift process. In order to efficiently change the composition of the gas as desired, additional steam may be introduced. This steam is steam obtained by passing through a dust collector after the flash dryer. The syngas having a desired composition via the water gas shift process is subjected to desulfurization, $CO_2$ removal and so on, followed by performing reaction (e.g. an F-T process, methanol synthesis) for manufacturing chemical products, resulting in chemical products.

FIG. 1 schematically illustrates an integrated gasification apparatus 100 for carbonaceous fuel according to an embodiment of the present invention.

With reference to FIG. 1, carbonaceous fuel is fed into a gasifier 10 via a line 1, and a gasification agent is fed into the gasifier 10 via a line 2. The carbonaceous fuel reacts with the gasification agent in the gasifier, thus producing a syngas.

The syngas produced in the gasifier is fed into a heater exchanger 20 along a line 3, and high-pressure steam produced in the heat exchanger 20 is fed to the top of a flash dryer 30 along a line 5 and is thus used to dry carbonaceous fuel containing water fed into the flash dryer via a line 6. The steam discharged from the flash dryer 30 is fed into a water gas shift reactor 40 via a line 7 from the bottom of the flash dryer, and thus causes a water gas shift reaction with the syngas fed via a line 4. The carbonaceous fuel having lowered water content, discharged from the flash dryer 30, is used as a carbonaceous fuel source of the gasifier 10 along a line 8.

Figure 2:
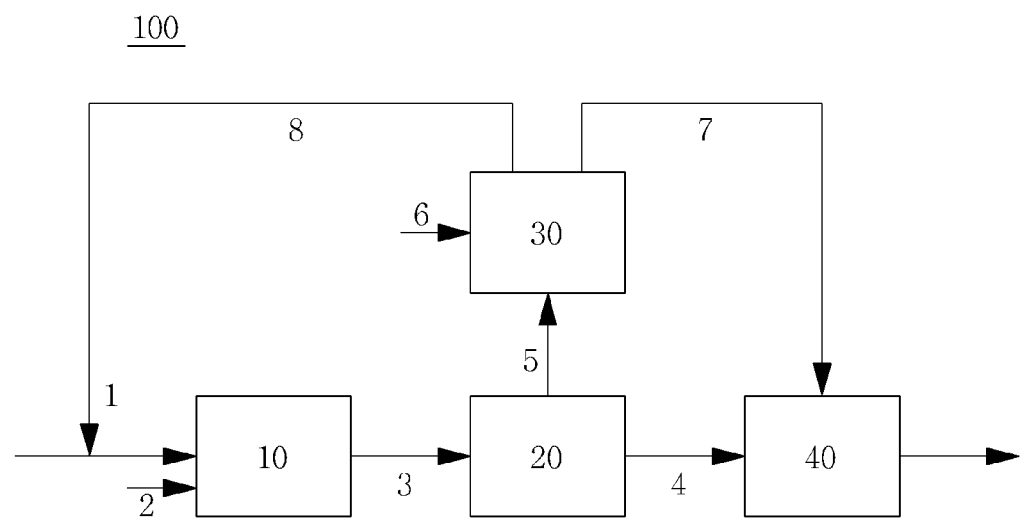
FIG. 2 is a block diagram illustrating an integrated gasification apparatus for carbonaceous fuel according to another embodiment of the present invention.

FIG. 2 schematically illustrates an integrated gasification apparatus 100 for carbonaceous fuel according to another embodiment of the present invention.

With reference to FIG. 2, carbonaceous fuel is fed into a gasifier 10 via a line 1, and a gasification agent is fed into the gasifier 10 via a line 2. The carbonaceous fuel reacts with the gasification agent in the gasifier, thus producing a syngas. The syngas produced in the gasifier is fed into a heater exchanger 20 along a line 3, and high-pressure steam produced in the heat exchanger 20 is fed to the bottom of a flash dryer 30 along a line 5 and is thus used to dry carbonaceous fuel containing water fed into the flash dryer via a line 6. The steam discharged from the flash dryer 30 is fed into a water gas shift reactor 40 via a line 7 from the top of the flash dryer, and thus causes a water gas shift reaction with the syngas fed via a line 4. The carbonaceous fuel having lowered water content, discharged from the flash dryer 30, is used as a carbonaceous fuel source of the gasifier 10 along a line 8.

The carbonaceous fuel may include low-grade coal such as lignite, sub-bituminous coal, etc., biomass, petroleum cokes, wood materials, agricultural waste and so on, and carbonaceous fuel having very high water content may be used. Specifically, the water content of the carbonaceous fuel fed into the flash dryer 30 via the line 6 is 10~60 wt %, and preferably 10~40 wt %, based on the total weight of the carbonaceous fuel. The limitation of water content of the carbonaceous fuel is determined depending on whether such fuel may be fed by means of the high-pressure feeder. If the water content exceeds 60 wt %, it is difficult to feed such fuel into the dryer via the high-pressure feeder from the storage tank.

The carbonaceous fuel fed into the flash dryer 30 may be ground using a grinder (not shown), and the particle size of the ground carbonaceous fuel may be about 2 mm or less. The particle size of the ground carbonaceous fuel may be about 1 mm or less in terms of promoting the gasification reaction in the gasifier. If the ground carbonaceous fuel has a large particle size, the contact area with the syngas may decrease, undesirably deteriorating heat exchange between the syngas and the carbonaceous fuel.

The temperature of the syngas fed into the heat exchanger may vary depending on the shape and operating conditions of the gasifier. For example, in the case where the syngas at 900° C. or higher is fed into the heat exchanger, it is cooled to 150~300° C. suitable for the subsequent processes, by means of the heat exchanger. As such, only a portion of heat of the syngas is applied to steam used in the dryer. For example, saturated steam under pressure conditions of the dryer may be controlled so as to be adapted for temperature conditions of heated steam using a superheater of the heat exchanger. The saturated steam may be produced in the heat exchanger of the gasifier or may be fed from the heat exchanger of the other subsequent processes. Because only the portion of the heat produced in the heat exchanger is used in the dryer, the temperature of the steam may be adjusted by controlling the conditions of the heat exchanger as necessary.

The temperature of the steam fed into the flash dryer may be about 260~500° C., and preferably about 350~500° C., and the pressure of the steam fed into the flash dryer may be about 12~44 bar, and preferably about 20~44 bar.

The temperature and pressure conditions of the steam may vary depending on the initial water content of carbonaceous fuel and the weight ratio between the steam and the carbonaceous fuel. The steam temperature at the outlet of the dryer is adjusted to be higher than the saturation temperature via control of the steam temperature at the inlet of the dryer. This is intended to prevent condensation of steam in the dryer.

Also, the temperature and pressure conditions of the steam are associated with the pyrolysis temperature of the carbonaceous fuel. The surface temperature of the drying target in the steam dryer is equal to the saturation temperature of the steam, and in order not to exceed the pyrolysis temperature, the temperature and pressure of the steam should be adjusted.

The steam fed into the flash dryer is high-temperature high-pressure steam, and is suitable for use in drying the carbonaceous fuel having high water content. Furthermore, steam obtained from the heat exchanger of the gasifier is used to dry the carbonaceous fuel, thus increasing efficiency of heat energy. Even when the carbonaceous fuel having high water content is used, loss of heat energy due to evaporation of the contained water or outflow of water vapor may be suppressed.

The water content of the carbonaceous fuel discharged from the flash dryer may be 1~10 wt % based on the total weight of the carbonaceous fuel. As high water content of the carbonaceous fuel fed via the flash dryer according to the embodiment of the present invention is considerably lowered, gasification efficiency may increase.

The syngas subjected to the gasification process may be fed into the water gas shift reactor to obtain high hydrogen products. The reaction between carbon monoxide and steam in the water gas shift reactor may produce carbon dioxide and hydrogen. When the water gas shift reaction is carried out, steam is required. According to an embodiment of the present invention, the temperature of the steam discharged from the flash dryer may be about 198~350° C., and is suitable for use as steam for the water gas shift reaction. As the steam discharged from the flash dryer is used in the water gas shift reaction, the conversion of CO may be increased, without the use of additional steam when the concentration of $H_2O$ in the syngas is not sufficient.

In the embodiment of the present invention, the flash dryer may have a carbonaceous fuel inlet and a steam inlet at the bottom thereof, and a carbonaceous fuel outlet and a steam outlet at the top thereof. Also, the flash dryer may have a carbonaceous fuel inlet and a steam inlet at the top thereof, and a carbonaceous fuel outlet and a steam outlet at the bottom thereof.

In the embodiment of the present invention, the gasification apparatus may further include a purifier for separating fine particles from the steam discharged from the flash dryer.

Figure 3:
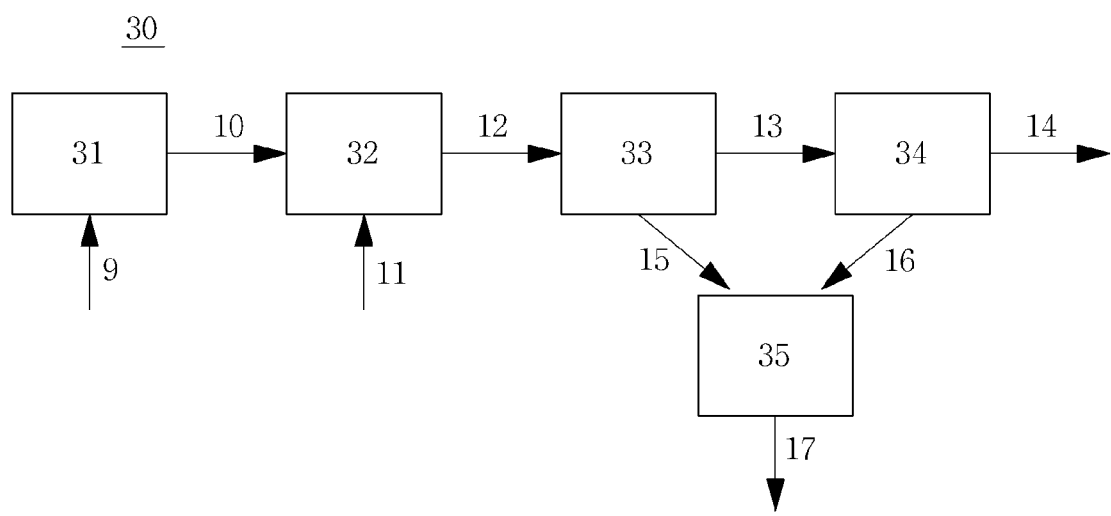
FIG. 3 is a block diagram illustrating a flash dryer according to an embodiment of the present invention.

FIG. 3 schematically illustrates the flash dryer according to an embodiment of the present invention.

The flash dryer 30 includes a high-pressure feeder 31 for feeding carbonaceous fuel, a dryer tube 32 for feeding steam, a cyclone 33 for separating steam from the carbonaceous fuel, a filter 34 for separating fine carbon particles from the steam separated by the cyclone, and a storage tank 35 for storing the carbonaceous fuel. Also, the flash dryer 30 may include an inlet linked to the heat exchanger 20 so as to allow the steam to flow into the flash dryer, and an outlet for discharging the steam from the flash dryer may be provided to the flash dryer. The steam discharged from the flash dryer may be emitted to the atmosphere or may be used in the water gas shift process.

With reference to FIG. 3, carbonaceous fuel containing water is fed into the high pressure feeder 31 along a line 9, and high-pressure steam produced by the heat exchanger of the gasifier is fed into the dryer tube 32 along a line 11, thus drying the carbonaceous fuel passed through the high pressure feeder along a line 10. The dried carbonaceous fuel and the steam are placed in the cyclone 33 along a line 12 so that the steam is placed in the water gas shift reactor through the filter along lines 13, 14. The carbonaceous fuel separated by the cyclone 33 and the carbonaceous fuel separated by the filter 34 are stored in the storage tank 35 along a line 15 and a line 16, respectively, and the carbonaceous fuel stored in the storage tank is used again as a source of the gasification process along a line 17.

As described hereinbefore, the present invention provides an integrated gasification apparatus for carbonaceous fuel. According to an embodiment of the present invention, high-pressure steam produced during a gasification process is directly used to dry carbonaceous fuel having high water content such as low-grade coal, and steam produced through the above drying process is directly used in a water gas shift process, thus reducing investment costs, increasing gasification efficiency, and saving the use of water resources in the entire process thanks to the use of water contained in the carbonaceous fuel.

According to the present invention, high-pressure steam produced during the gasification process is used, without the use of conventional syngas or fuel gas, and thereby introduction of tar or fine particles does not occur, thus preventing pollution of coal and making it easy to recover fine coal particles. Furthermore, because high-pressure steam is used, pipes can be prevented from corroding and it is easier to control oxygen level.

Also, according to the present invention, the use of a flash dryer enables additional production of high-pressure steam compared to when using conventional atmospheric dryers, so that such steam can be utilized in a water gas shift process.

Although the embodiments of the present invention regarding the integrated gasification apparatus for carbonaceous fuel have been disclosed for illustrative purposes, those skilled in the art will appreciate that a variety of different modifications, additions and substitutions are possible, without departing from the scope and spirit of the invention as disclosed in the accompanying claims.

Accordingly, such modifications, additions and substitutions should also be understood as falling within the scope of the present invention.

What is claimed is:

1. An integrated gasification apparatus for carbonaceous fuel, comprising:
    a gasifier to react carbonaceous fuel and a gasification agent to produce a syngas, wherein the gasifier includes a heat exchanger;
    a flash dryer to lower a water content of the carbonaceous fuel containing water fed into the flash dryer using high-pressure steam produced in the heat exchanger; and
    a water gas shift reactor to produce hydrogen and carbon dioxide from the steam discharged from the flash dryer and the syngas,
    wherein the flash dryer comprises a high-pressure feeder for feeding the carbonaceous fuel, a dryer tube for feeding the steam, a cyclone for separating the steam and the carbonaceous fuel, a filter for separating fine particles from the steam separated by the cyclone, and a storage tank for storing the carbonaceous fuel.

2. The integrated gasification apparatus of claim 1, wherein the carbonaceous fuel is selected from the group consisting of low-grade coal, biomass, and petroleum cokes.

3. The integrated gasification apparatus of claim 1, wherein the water content of the carbonaceous fuel fed into the flash dryer is 10~60 wt % based on a total weight of the carbonaceous fuel.

4. The integrated gasification apparatus of claim 1, wherein the carbonaceous fuel fed into the flash dryer has a particle size of 2 mm or less.

5. The integrated gasification apparatus of claim 1, wherein the steam fed into the flash dryer has a temperature of 260~500° C.

6. The integrated gasification apparatus of claim 1, wherein the steam fed into the flash dryer has a pressure of 12~44 bar.

7. The integrated gasification apparatus of claim 1, wherein the water content of the carbonaceous fuel discharged from the flash dryer is 1~10 wt % based on a total weight of the carbonaceous fuel.

8. The integrated gasification apparatus of claim 1, wherein the steam discharged from the flash dryer has a temperature of 198~350° C.

9. The integrated gasification apparatus of claim 1, wherein the carbonaceous fuel and the steam are fed to a bottom of the flash dryer and then discharged from a top of the flash dryer.

10. The integrated gasification apparatus of claim 1, wherein the carbonaceous fuel and the steam are fed to a top of the flash dryer and then discharged from a bottom of the flash dryer.

11. The integrated gasification apparatus of claim 1, further comprising a purifier for separating fine particles from the steam discharged from the flash dryer.

* * * * *